UNITED STATES PATENT OFFICE.

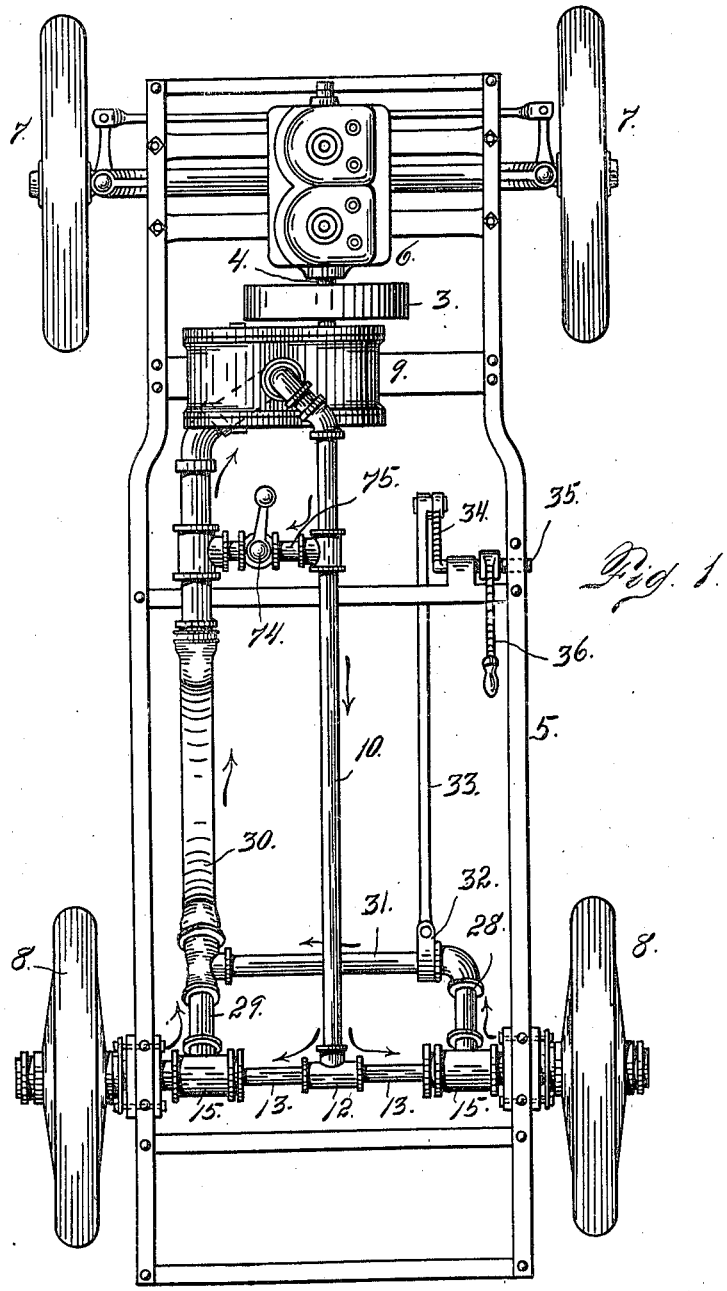

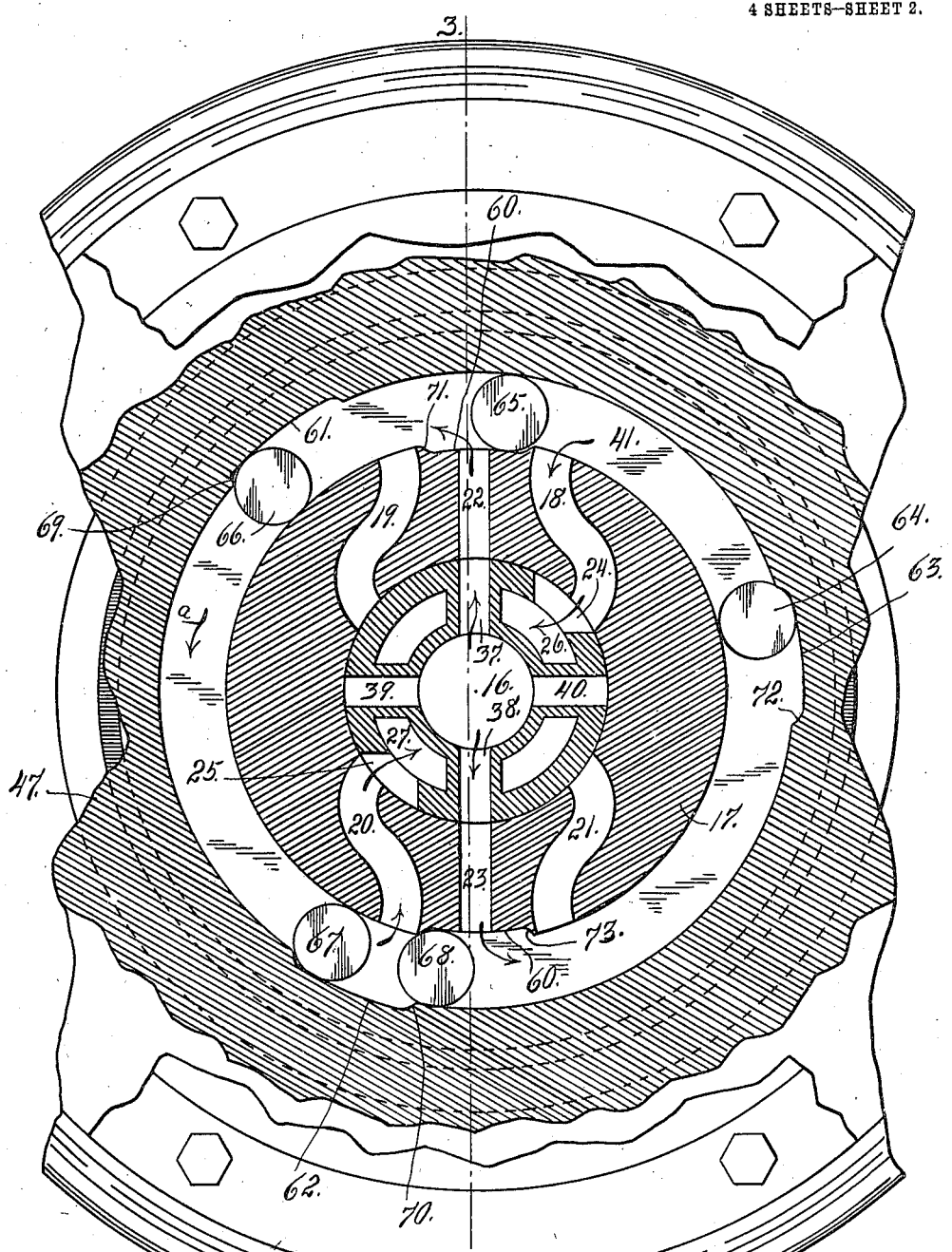

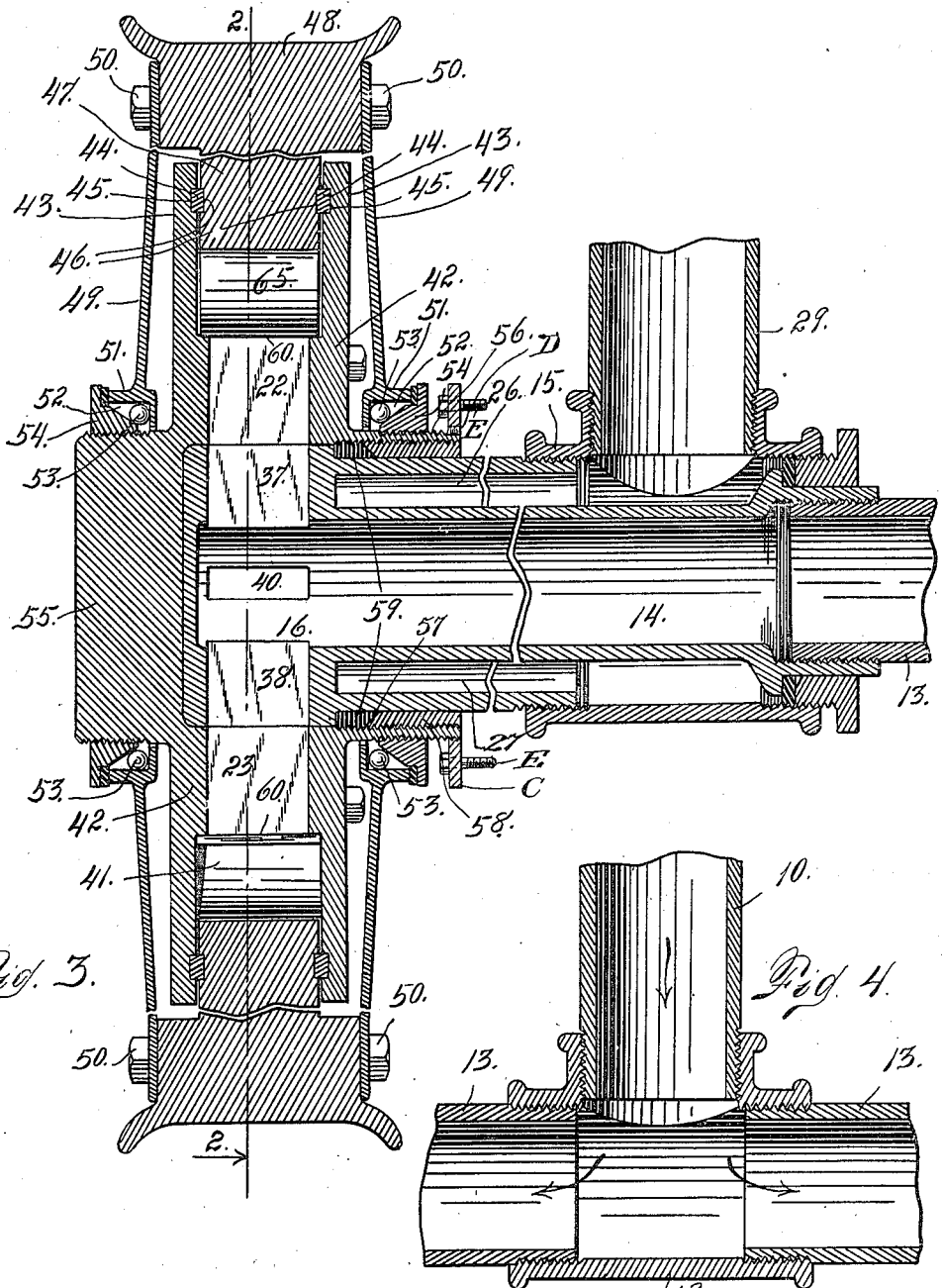

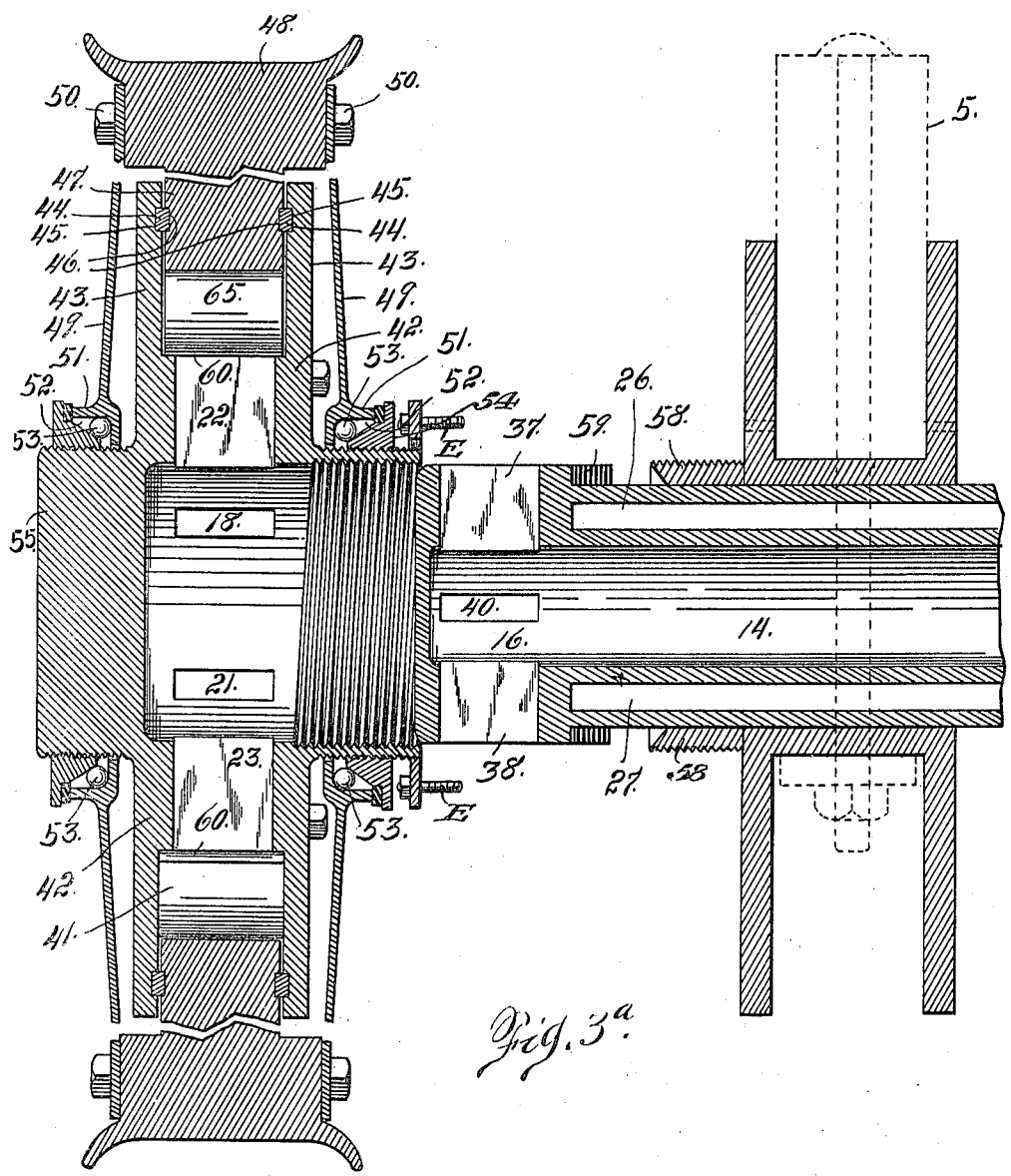

FRANK H. SUMMERIL, OF DENVER, COLORADO, ASSIGNOR OF ONE-HALF TO HORATIO N. NORTON, OF MOUNT VERNON, NEW YORK.

FLUID POWER-TRANSMISSION APPARATUS.

1,064,562.   Specification of Letters Patent.   Patented June 10, 1913.

Application filed May 21, 1910.   Serial No. 562,790.

*To all whom it may concern:*

Be it known that I, FRANK H. SUMMERIL, a citizen of the United States, residing in the city and county of Denver and State of Colorado, have invented certain new and useful Improvements in Fluid Power-Transmission Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in fluid power-transmission apparatus for vehicles, the novel features consisting more especially of the mechanism whereby the wheels of a vehicle are individually operated through the instrumentality of roller pistons which act alternately on the wheel as driving devices and stationary abutments, the fluid, as oil, acting upon the driving members which are caused to travel in a channel formed in a stationary casing around which the wheel travels, the rim of the wheel having a central member protruding into this casing, and constructed to be acted upon by the driving piston members. The inner wall of the channel is stationary while the outer wall is formed by the inwardly protruding member of the wheel. In the stationary member of the wheel are formed inlet and exhaust passages which communicate with ducts formed in a centrally located hollow valve piece which is formed relatively thick and cored out to form the inlet and exhaust ducts which are in communication with a pipe or conduit through which the oil is pumped, the pump being preferably operated by an explosive engine when the apparatus is in use on an automobile or similar vehicle.

When the apparatus is in use, I may employ five of the movable or floating pistons, two of which are always inactive or stationary and form abutments in the rear of the coöperating active piston member. The inner and outer walls of the channel are provided at intervals with recesses and when the active or driving piston member reaches an inactive member, the active member displaces the inactive member and as soon as this occurs the functions of the two members are reversed, the formerly active member becoming inactive, and the member which was previously stationary proceeds to travel under the influence of the propelling oil or other fluid pumped into the channel, as hereinafter explained more in detail.

Having briefly outlined my improved construction, I will proceed to describe the same in detail, reference being made to the accompanying drawing in which is illustrated an embodiment thereof.

In this drawing: Figure 1 is a top plan view of the running gear of an automobile equipped with my improved liquid power-transmission apparatus. Fig. 2 is a view of one of the wheels of the vehicle partly in central section and partly in elevation, the sectionized portion being taken on the line 2—2, Fig. 3, the parts being shown on a larger scale. Fig. 3 is a horizontal section taken on the line 3—3, Fig. 2, looking toward the right. Fig. 3$^a$ is a vertical section or a section at right angles to the section of Fig. 3. Fig. 4 is a section taken through the T-shaped portion of the conduit through which the oil passes to the driving wheels of the machine.

The same reference characters indicate the same parts in all the views.

Let the numeral 5 designate the framework of an automobile or horseless vehicle, equipped with an explosive engine 6, forward wheels 7 and rear or driving wheels 8. The engine is connected in operative relation with a rotary pump 9 whose construction need not be described in detail as nothing is claimed thereon in this application. This pump, however, being actuated from the engine, drives the oil or other liquid through an eduction pipe 10 which leads to a centrally located T-shaped member 12, forming a coupling or union whereby the conduit 10 is connected with the transverse pipe sections 13, which lead to or communicate with the central passages 14 of the cut-off cylinders 15 of the liquid transmission apparatus. These cylinders extend into and are surrounded by a stationary member 17 provided with exhaust passages 18, 19, 20 and 21, and induction passages 22 and 23. Two of the exhaust passages only are simultaneously in use and these used passages are in communication with ports 24 and 25 which are in communication with ducts 26 and 27 formed in the outer portions of the cylinders 15; these ducts 26 and 27 being in communication with hollow branch pipes or conduits 28 and 29 which communicate with a flexible return conduit 30. These branch conduit members 28 and 29 are rigidly connected with a transverse pipe member 31 to which is clamped a ring 32 connected by means of a rod 33 with a crank 34 of a rock shaft 35 to which is secured a hand lever 36.

By the use of the lever 36, the transverse conduit or pipe section 31 is given a partial rocking movement, whereby the branch conduit members 28 and 29 are moved in one direction or the other sufficiently to impart a partial rotary movement to the cylinders 15, this movement being sufficient to cut off one pair of exhaust passages from the liquid and to bring another pair of passages into communication with the exhaust ducts of the cylinders for the purpose of reversing the travel of the vehicle. The cylinder 15 is also provided with induction passages 37, 38, 39 and 40; and when the cylinder is turned for the purpose of reversing the travel of the vehicle, one pair of induction passages 37 and 38 is cut off from communication with the passages 22 and 23, while the other pair of induction passages 39 and 40 of the cylinder are brought into communication with the passages 22 and 23, whereby the propelling liquid, as it is driven from the pump, is always caused to pass into a channel 41 formed in the stationary wheel-hub or casing 42 in whose central portion 17 the exhaust passages 18, 19, 20 and 21 and the induction passages 22 and 23 are formed. This casing 42 extends outwardly beyond the channel 41 on both sides, as shown at 43 and is grooved as shown at 44 to receive packing rings 45 which are also partially seated in circumferential grooves 46 formed in the inwardly projecting part 47 of the wheel rim 48. This rim is supported by exteriorly located plates 49 which are bolted to the rim as shown at 50, the inner edges of the plates 49 being expanded as shown at 51 and hollowed out to form raceways 52 for bearing balls 53, the said raceways coöperating with cones 54 screwed upon stationary portions 55 and 56 of the casing 42. Between the portion 56 of the casing which forms a lateral extension beyond the body of the casing 42, and each cylinder 15, a stuffing box 57 is located. In this stuffing box is inserted a packing 59 and a gland 58 engaging the said packing, whereby a liquid tight joint is formed between the cut-off cylinder and the stationary portion 42 of each wheel. A collar C is threaded on the lateral extension 56, and a locking key D inserted between the collar and the extension 56 for locking the collar against turning, and bolts E are passed through the collar and the frame of the vehicle, thus securing the member 43 securely to the vehicle, and preventing the same from turning.

Fig. 3$^a$ is a vertical section through the wheel. In this view the wheel and axle are shown separated, the axle being equipped with a hub adapted to receive the frame member 5 which enters the relatively deep groove or recess of the hub part in which it is secured by bolts, one of which is shown in dotted lines.

The outer wall or the periphery of the stationary member 17, is provided with shallow recesses 60, as shown in the drawing, two of these recesses located diametrically opposite each other being employed. It will be understood that these shallow recesses 60 are formed in the inner wall of the channel 41; whereas, the outer wall of this channel or the interiorly projecting reduced circumferential rim member 47 is provided with three similar shallow recesses 61, 62 and 63. Within this circular channel 41 a number of cylindrical pistons 64, 65, 66, 67 and 68 are located. The diameter of the cylindrical pistons is such with reference to the width of the channel 41, that the channel is just wide enough to receive these pistons; where the recesses of either wall are located. When, however, an inner and an outer recess are brought into register, one of the cylindrical pistons, namely, an inactive one, is driven out of a recess in the wall of the central member 17 of the casing, while another cylindrical piston enters said recess, the piston driven out then acting under the influence of the liquid as a driving piston while the piston in the rear constitutes an abutment which resists the rearward flow of the liquid which is thus caused to act upon the driving piston, the latter directly engaging a shoulder 69 at one extremity of a recess in the part 47 of the wheel rim which is thus caused to rotate around and within the stationary structure 43.

From the foregoing description the use and operation of my improved liquid power-transmission apparatus will be readily understood. Assuming that the engine 6 is in operation, its shaft 4 upon which a fly-wheel 3 is mounted serves to operate the rotary pump 9, whereby the propelling liquid, as oil, is driven through the pipe 10 into the branch horizontally disposed pipe members 13 of the rear axle, whence the oil passes through the central hollow portions 16 of the cylinders 15, and thence through the induction passages 37 and 38, into and through the registering passages 22 and 23, into the channel 41 at diametrically opposite points. In this event the liquid acts upon the cylindrical pistons 66 and 64, while the two pistons 65 and 68 serve as abutments to prevent the rearward flow of the oil in the channel. The portions of the channel between the pistons 66 and 67; 67 and 68; and 64 and 65, are filled with oil or any other propelling liquid that may be employed. However, the oil between the pistons 67 and 68; and between the pistons 64 and 65, is in communication with exhaust ducts 20 and 18, respectively, while the liquid in the portion of the channel between the pistons 66 and 67 is merely idle, until after the piston 67 passes the duct 20, when the liquid will begin to exhaust in front of the piston 66, while the piston 67 will enter the recess 60 of the stationary hub member 17 and constitute an abutment for the driving liquid which will then enter the channel through the duct 23 and will act on the piston 68 which then becomes a driving piston engaging a shoulder 70 formed at the forward extremity of the recess 62. Now if it is desired to reverse the travel of the vehicle, the lever 36 will be actuated sufficiently to move the rod 33 the necessary distance to impart a partial rotary movement to the transverse conduit member 31, whereby the pipe members 28 and 29 acting as rock-arms impart sufficient rotary movement to the cylinders 15, to cut off the exhaust through passages 18 and 20, and open the passages 19 and 21 for exhaust purposes. In this event the passages 39 and 40 of each cylinder 15, will register respectively with the passages 22 and 23 of the stationary member 17 for induction purposes.

The arrangement of the ports 24 and 25 is such that during the rotary movement of either cylinder 15 for reversing purposes, the propelling liquid will enter the passages 18 and 20 through the passages 37 and 38 respectively, of the cylinder before the ports 24 and 25 register with the passages 21 and 19 respectively; and the action of this liquid flowing through the passage 18 from the induction port 37 will throw the piston 65 toward the left against the shoulder 71 of the recess 60, and the piston 64 against the shoulder 72 of the recess 63; while the passage of the liquid from the induction opening 38 through the passage 20, will throw the piston 68 toward the right causing it to engage the shoulder 73 of the recess 60, thus placing the pistons 65 and 68 on opposite sides of the exit extremities of the passages 22 and 23 from that which they previously occupied at the beginning of the movement of the cylinders 15 for reversing purposes. Now, as soon as the cylinders have reached their limit of travel for this purpose, whereby each is given a movement of ninety degrees, whereby the induction passages 40 and 39 are made to register with the induction passages 22 and 23 respectively, the driving liquid will enter the channel 41 at the right of the piston 65 and at the left of the piston 68, the exhaust taking place through the passages 19 and 21. It will now be evident that the liquid acting upon the piston 65 which is in engagement with the shoulder 71, cannot drive the wheel, since the shoulder 71 is on the stationary member 17; and for the same reason the driving liquid acting on the piston 68 can have no tendency to drive the wheel. Hence these two pistons 65 and 68 can only act as abutments to prevent the flow of the propelling liquid beyond them in the channel 41. Under these circumstances the liquid flowing through the passage 22 will act upon the piston 64 to drive the wheel in a direction the reverse of the arrow $a$ in Fig. 2, since it enters the channel between the pistons 65 and 64, while the liquid entering the channel 41 through the passage 23 will act upon the piston 67 to drive the wheel in the same direction.

It will be observed that when the ports 21 and 19 have been uncovered by the ports 27 and 26 there is practically no resistance to the travel of the piston 64 in the direction of the reverse of the arrow $a$ since the liquid in front of the piston is in communication with the exhaust passages 21, and for this same reason, the liquid in front of the piston 67 offers practically no resistance to its travel in the same direction, since the piston 66, together with the liquid in front of the piston 67 is moving toward the exhaust passage 19 through which the liquid flows freely. It must be noted that before the induction passages 37 and 38 have moved across the exhaust passages 18 and 20 respectively, whereby the induction is temporarily through these exhaust passages into the channel 41 for the purpose of shifting the pistons 65 and 68 toward the left and right respectively, the parts 24 and 25 have come partly into register with the passages 21 and 19 respectively, thus placing the exhaust ducts 26 and 27 in communication with the channel 41, at the left of the piston 65 and at the right of the piston 68, thus allowing the liquid to exhaust and relieving the resistance to the movement of the pistons 65 and 68 toward the left and right respectively for reverse purposes, as heretofore explained.

In order to make it practicable to employ the conduit members 28 and 29 as rock-arms for imparting the partial rotary movement to the cylinders 15 for reversing purposes, the exhaust conduit 30 is made flexible and is also made sufficiently loose or of the proper length to permit the necessary travel of the pipe member 31.

When it is desired to relieve the propelling wheels from the full force of the driving liquid, a valve 74, located in a pipe 75 connecting the conduits 10 and 30, may be opened to allow a portion or even all of the liquid to pass through the pipe 75 from the pipe 10, thus making a short circuit through the pump and cutting off, either partially or wholly, the driving liquid from the rear or propelling wheels. Before the operator shifts the reversing lever 36, the valve 74 should be partly opened. Then during the very short space of time when the induction passages in the valve 16 are closed, that is, while the valve is being rotated to reverse the direction of travel of the machine, the only effect will be to retard the engine temporarily.

While in the drawing I have illustrated my improvement as applied to two wheels of the vehicle, it must be understood that it may be used in connection with all of the wheels, if desired, or a single wheel only, if preferred. It must also be understood that the mechanism comprising the movable pistons arranged to displace each other whereby they alternately become driving and abutment members, traveling in the channel through which the propelling liquid flows, may be employed for rotating a driving wheel, pulley or other rotatable part of any character, whether used in connection with a vehicle or not. It must also be understood that any desired number of recesses or pockets formed in the adjacent walls of the piston chamber or channel may be employed, together a corresponding number of pistons. It must also be understood that the invention is not limited to cylindrical pistons as these elements may be made of any shape which convenience or the necessities of any particular case may dictate or require.

While in the foregoing specification the motive fluid referred to has generally been designated as liquid, it must be understood that any motive fluid other than liquid, as steam or air, may be employed in the operation of my improved construction.

Having thus described my invention, what I claim is:

1. In fluid power-transmission apparatus for vehicles, the combination with a wheel of the vehicle, and a pump for circulating the fluid, of a motor, comprising a stationary member in which is formed a channel for the driving liquid, independent pistons located in said channel, the latter being exteriorly closed by the rim of the vehicle, the adjacent surfaces of the stationary member and the wheel rim being provided with recesses to accommodate the pistons, whereby the depth of the channel increased by that of a recess is just equal to the diameter of a piston, the stationary member being provided with an induction and exhaust passage in communication with the said channel and the pump for circulating purposes.

2. The combination with a vehicle, a wheel thereof and a liquid pump, of a stationary member having induction and exhaust passages in communication with the pump, a circular chamber between the stationary member and the rim of the wheel, recesses formed in the adjacent surfaces of the wheel rim and the stationary member, pistons located in said chamber and of a diameter equal to the depth of the channel plus that of the recesses, there being a piston for each recess in both members, substantially as described.

3. The combination with a vehicle, a pair of wheels thereof, and a liquid pump, of a stationary member for each wheel of the vehicle, said member having induction and exhaust passages in communication with the pump, a circular chamber between the stationary member and the rim of each wheel, recesses formed in the adjacent surfaces of the wheel rims and the stationary members, pistons located in the said chambers and of a diameter equal to the depth of the chamber plus that of the recesses, there being a piston for each recess in both members.

4. The combination with a vehicle, a pair of wheels thereof and a pump, of a stationary member having induction and exhaust passages for each wheel, a circular chamber between the stationary member and the rim of each wheel, recesses formed in the adjacent surfaces of the wheel rims and the corresponding stationary members, pistons located in said chambers and of a diameter equal to the depth of the chamber plus that of one of the recesses of either the stationary member or the wheel rim, there being a piston for each recess in both members, and means for introducing liquid from the pump to the piston chambers of each wheel, whereby certain of the pistons act as driving members for the wheel rims, while other coöperating pistons serve as abutments, the coöperating pistons exchanging places at predetermined intervals and acting alternately as driving and abutment members, substantially as described.

5. The combination with a wheel to be rotated, of a liquid motor, comprising a circular chamber closed on one side by a portion of the wheel to be rotated, the opposite side of the chamber being closed by a stationary member, the adjacent surfaces of the wheel portion and stationary member having hollow recesses, pistons located in said chamber and of a diameter equal to the depth of the chamber plus that of one of the recesses, there being a piston for each recess in both the stationary member and the wheel portion, and means for introducing liquid to the said chamber and exhausting it therefrom, the liquid entering the chamber between pairs of coöperating pistons, one of which serves as a driving member, while the other serves as an abutment member, the pairs of coöperating pistons changing functions as the recesses in the two members register, whereby the driving piston becomes the abutment member and the abutment member the driving piston, substantially as described.

6. The combination with a wheel-rim to be rotated and a stationary member around which said rim is adapted to rotate, a circular chamber being formed between the stationary member and the wheel rim, recesses being formed in the adjacent surfaces of the wheel rim and the stationary member, cylindrical pistons located in the said chamber, equal in number to the recesses in both the wheel rim and stationary member, the said pistons each being of a diameter equal to that of the depth of the chamber plus that of a recess in either member, means for introducing driving liquid between certain of the pistons and exhausting the liquid from between certain other pistons, the pistons acting together in pairs whereby they become alternately driving and abutment members, the individual pistons of each pair exchanging functions as the recesses of the two members are brought into register, whereby the driving and abutment pistons become respectively abutment and driving members, substantially as described.

7. The combination with a wheel-rim to be rotated, of a motor comprising a stationary member around which the wheel rim is adapted to rotate, a circular channel being formed between the stationary member and wheel rim, the adjacent surfaces of the wheel rim and the stationary member having shallow recesses, cylindrical pistons located in the said chamber, one for each recess in both members, the pistons being of a diameter equal to that of the depth of the channel plus that of one of the recesses in either member, the stationary member having inlet and exhaust passages, and means for introducing driving liquid through the inlet passages and causing it to exhaust through the exhaust passages, that which enters through the inlet passages entering the chamber between two pistons acting respectively as driving and abutment members, one piston of each pair engaging a recess of the wheel-rim and the other a recess of the stationary member, the pistons of the several pairs exchanging functions at predetermined intervals, whereby the driving piston of one pair displaces the abutment piston of another pair, the displaced piston then becoming a driving member, and the displacing piston an abutment member, substantially as described.

8. The combination of a wheel rim mounted to rotate, of a stationary member around which the wheel-rim travels, a circular chamber being formed between the two members, the stationary member being provided with induction and exhaust passages, a pump for circulating liquid through the said chamber and back to the pump, the adjacent surfaces of the wheel-rim and stationary member having shallow recesses, the stationary member having a recess at the exit extremity of each inlet passage, and the wheel-rim member having a number of recesses greater by one than the recesses formed in the stationary member, pistons located in the said chamber and engaging the respective recesses of both members, the pistons acting in pairs, one piston of each pair serving as an abutment member, and the other has a driving member, the individual pistons of the several pairs exchanging functions at predetermined intervals, substantially as described.

9. The combination with a wheel to be rotated, of a stationary member having inlet and exhaust passages, a circular chamber formed between the wheel-rim and the stationary member, independent pistons located in said chamber, means for maintaining the pistons in coöperative relation whereby one engages the stationary member and acts as an abutment while the other engages the wheel-rim in the capacity of a driving member, means for introducing and exhausting propelling liquid to and from the said chamber, the individual pistons of adjacent pairs exchanging functions at predetermined intervals, whereby the driving and abutment pistons alternately become abutment and driving members.

10. The combination with a fluid pump, of a motor, comprising a wheel, a stationary member around which the wheel is mounted to rotate, a circular chamber interposed between the wheel member and the stationary member, independent pistons located in said chamber, means for maintaining the said pistons in the relation of pairs, the individual pistons of each pair serving as driving and abutment members, means for introducing motive fluid into the said chamber between the pistons constituting each pair and exhausting the fluid between adjacent pairs of pistons, the individual pistons of adjacent pairs exchanging functions at predetermined regular intervals, whereby the driving and abutment pistons become the abutment and driving pistons, substantially as described.

11. The combination with a vehicle having one or more driving wheels, each consisting of a stationary member and a surrounding rotary rim, a circular chamber being interposed between the wheel-rim and the stationary member, means for introducing motive fluid to and exhausting it from the said chamber, pistons located in the said chamber and movable therein independently of each other, means for maintaining the pistons in the relation of pairs, the individual pistons of one or more pairs being arranged on opposite sides of an inlet passage for motive fluid, one of these pistons serving as an abutment member and the other as a driving member, the individual pistons of adjacent pairs exchanging functions at predetermined intervals whereby the driving piston of one pair displaces the stationary abutment piston of the other pair, whereby the latter becomes a traveling driving member and the former a stationary abutment member, substantially as described.

12. A motor, comprising a stationary member, a wheel-rim surrounding the same and rotatably mounted, a circular chamber interposed between the stationary member and the wheel-rim, the stationary member having inlet and exhaust passages communicating at one extremity with the circular chamber, a fluid pump for circulating liquid through the said passages and said chamber, pistons located in said chamber and adapted to travel therein independently of each other, these pistons being arranged in pairs, the individual members of each pair being arranged on opposite sides of each inlet fluid passage, the individual pistons of adjacent pairs exchanging functions with each other at predetermined intervals, substantially as described.

13. A motor, comprising a wheel-rim, a stationary member around which the wheel-rim rotates, a circular chamber being formed between the wheel-rim and the stationary member, induction and exhaust passages formed in the stationary member, a reversing valve located in the stationary member and having induction and exhaust ports and passages coöperating with the corresponding passages of the stationary member, and pistons located in the said chamber and traveling therein independently of each other, means for maintaining said pistons in the relation of pairs, the individual pistons of each pair being arranged on opposite sides of the induction passages, the individual pistons of adjacent pairs exchanging functions with each other at predetermined intervals, whereby the abutment pistons become driving members and the driving member abutment pistons, substantially as described.

14. The combination with a wheel to be rotated, of a stationary member having inlet and exhaust passages, a circular chamber formed between a part of the wheel and the stationary member, independent pistons located in said chamber and arranged in pairs, means for maintaining the pistons in coöperative relation, whereby one piston of each pair engages the stationary member and acts as an abutment while the other engages the part of the wheel to be driven, in the capacity of a driving member, and means for introducing and exhausting propelling liquid to and from the said chamber, the individual pistons of adjacent pairs exchanging functions at predetermined intervals, substantially as describd.

15. The combination with a wheel to be rotated, of a motor comprising a stationary member, the structure having a circular chamber formed between the stationary member and a part of the wheel, the adjacent surfaces of the wheel portion and the stationary member having pockets, pistons located in the said chamber, one for each of said pockets in both members, the pistons being of a size equal to the depth of the chamber plus that of one of the pockets in either member, the stationary member having inlet and exhaust passages, means for introducing driving liquid through the inlet passages and causing it to exhaust through the exhaust passages, the exhaust passages being arranged in pairs, and a reversing valve having inlet and exhaust passages, this valve normally closing one exhaust passage of each pair, and being movable to alternately utilize the exhaust passages for reversing the travel of the wheel, substantially as described.

16. The combination with a member to be rotated, of a motor comprising a stationary element, the structure having a circular chamber formed between the stationary element and a part of the member to be rotated, the adjacent surfaces of the rotatable member and the stationary element having pockets, pistons located in the said chamber, the pistons being of a size equal to the depth of the chamber plus that of one of the pockets in either the stationary element or the rotatable member, the stationary element having inlet and exhaust passages, means for introducing driving liquid through the inlet passages and causing it to exhaust through the exhaust passages, the exhaust passages being arranged in pairs, and a reversing valve having inlet and exhaust passages, this valve normally closing one exhaust passage of each pair and being movable to alternately utilize the exhaust passages for reversing the travel of the rotatable member, the induction and exhaust passages of the valve and stationary element being so arranged that some driving fluid is admitted to the circular chamber through an exhaust passage of the stationary element, and exhausted from the chamber through an inlet passage of the stationary element, the said inlet and exhaust fluid entering the circular chamber on opposite sides of an abutment piston for the purpose of shifting the same in its pocket from one side of an induction passage to the other for reversing purposes.

17. The combination with a part to be rotated, of a stationary member, a circular chamber formed between the part to be rotated and the stationary member, independent pistons located in said chamber and arranged in pairs, and means for maintaining the pistons in coöperative relation whereby one piston of each pair engages the stationary member and acts as an abutment, while the other engages the part to be rotated in the capacity of a driving member.

18. The combination with a part to be rotated, of a stationary member having inlet and exhaust passages, a circular chamber formed between the part to be rotated and the stationary member, independent pistons located in said chamber and arranged in pairs, means for maintaining the pistons in coöperative relation, whereby one piston of each pair engages the stationary member and acts as an abutment, while the other engages the part to be rotated in the capacity of a driving member, and means for introducing and exhausting propelling fluid to and from the said chamber, the individual pistons of adjacent pairs exchanging functions at predetermined intervals, substantially as described.

19. The combination with a part to be rotated, of a stationary member, a circular chamber formed between the part to be rotated and the stationary member, a pair of independent pistons located in said chamber, and means for maintaining the pistons in coöperative relation, whereby one piston engages the stationary member and acts as an abutment, while the other engages the part to be rotated in the capacity of a driving member.

20. The combination with a part to be rotated, of a stationary member having inlet and exhaust passages, a circular chamber formed between the part to be rotated and the stationary member, a pair of independent pistons located in said chamber, means for maintaining the pistons in coöperative relation, whereby one piston engages the stationary member and acts as an abutment, while the other piston engages the part to be rotated in the capacity of a driving member, and means for introducing and exhausting propelling fluid to and from the said chamber, the individual pistons exchanging functions at predetermined intervals, substantially as described.

21. The combination with a part to be rotated, of a stationary member, a circular chamber formed between the part to be rotated and the stationary member, independent pistons located in said chamber and arranged in pairs, means for maintaining the pistons in coöperative relation, whereby one piston of each pair engages the stationary member and acts as an abutment, while the other engages the part to be rotated in the capacity of a driving member, and means for introducing and exhausting propelling fluid to and from the said chamber, the individual pistons of adjacent pairs exchanging functions at predetermined intervals, substantially as described.

22. The combination with a part to be rotated, of a stationary member, a circular chamber formed between the part to be rotated and the stationary member, two independent pistons located in said chamber, means for maintaining the pistons in coöperative relation, whereby one piston engages the stationary member and acts as an abutment, while the other engages the part to be rotated in the capacity of a driving member, and means for introducing and exhausting motive fluid to and from the said chamber, the individual pistons exchanging functions at predetermined intervals.

23. The combination with a part to be rotated, of a stationary member, an annular chamber formed between the part to be rotated and the stationary member, independent pistons located in the annular chamber, and means for maintaining the pistons in operative relation, whereby one piston acts as an abutment, while the other acts in the capacity of a driving member, substantially as described.

24. A machine of the class described, comprising a stationary member and a rotary member, a chamber formed between the rotary member and the stationary member, independent members located in said chamber, and means for maintaining the members in coöperative relation, whereby one member acts in the capacity of a driver, while the other acts in the capacity of an abutment, substantially as described.

In testimony whereof I affix my signature in presence of two witnesses.

FRANK H. SUMMERIL.

Witnesses:
A. J. O'BRIEN,
VIRGINIA I. DAVIS.